Feb. 4, 1964  P. M. SWEENEY ETAL  3,120,381
GLASS FIBER PAD CONSTRUCTION
Filed Dec. 4, 1961  5 Sheets-Sheet 1

INVENTORS
LAURENCE L. EBERHART
PATRICK M. SWEENEY
BY

ATTORNEYS

THEORETICAL VIBRATION ISOLATION CURVES

VIBRATION ISOLATION FOR 1-INCH THICK GLASS FIBER MATERIAL

VIBRATION ISOLATION FOR 2-INCH THICK GLASS FIBER MATERIAL

INVENTORS
PATRICK M. SWEENEY
LAURENCE L. EBERHART

ATTORNEYS

United States Patent Office 3,120,381
Patented Feb. 4, 1964

3,120,381
GLASS FIBER PAD CONSTRUCTION
Patrick M. Sweeney and Laurence L. Eberhart, Dublin, Ohio, assignors to Consolidated Kinetics Corporation, Columbus, Ohio, a corporation of Ohio
Filed Dec. 4, 1961, Ser. No. 156,707
6 Claims. (Cl. 267—1)

This invention relates to glass fiber pad constructions.

In general, the pad constructions of the present invention are made up in relatively large units of pad stock which are uniquely adapted to be cut up into smaller pads of any required size. Each of the relatively large sheets of pad stock comprises a body portion of glass fiber material that includes on the top and bottom thereof intersecting slots which form webs that divide the pad into a plurality of uniform body units. The top and bottom sides of the pad are impregnated for a sufficient depth to provide a flexible covering for the glass fiber material. The web portions, however, are completely impregnated through their entire thicknesses. With this arrangement the large sheet of pad stock can be cut up into smaller pads of any required size by merely severing the web portions and since the web portions are completely impregnated the edges of the smaller pads will be completely sealed whereby the glass fiber material is protected from contaminants.

As another aspect of the present invention the flexible covering is impervious to air, sealed within its confines, so that the composite pad operates as a glass fiber spring modified by an auxiliary air spring. When a load is applied to the pad the compressed air confined within the impervious flexible covering supports a portion of the load and the compressed pad of glass fiber material supports a portion of the load applied to the composite pad.

As another aspect of the present invention, the flexible covering is applied to the glass fiber pad in a manner as to be pervious to permit the ingress and the egress of air to and from the confines of the pervious flexible covering when the composite pad is subjected to variations in loading. Since the flow of air is restricted by relatively small orifices, the flexible covering and the air passing into and out of its confines provide shock absorber action for the glass fiber spring. The action of the damped air spring is modified since the variations in loading are resisted by both the fiber glass pad and the action of the air that is releasably confined within the pervious covering.

As another aspect of the present invention, the previously described composite pads are utilized in systems that maintain substantially constant natural frequencies under variations in applied loads. It has been discovered, in accordance with the present invention, that the previously described glass fiber pads have force-deflection curves that conform with the following equation $$W = W_0 e^{A(\delta - \delta_0)}$$

When a pad is subjected to a load or force substantially equal to or greater than $W_0$, the natural frequency of the system will remain constant under variations in the imposed force or supported load.

As another aspect of the present invention it has been discovered that glass fiber pads of different densities have different values of $W_0$ above which natural frequencies are maintained substantially constant. Moreover, glass fiber pads of different densities have different natural frequency values, with respect to loading, at which the natural frequency remains substantially constant. Hence, it will be understood that a vibration isolation system can be designed so as to maintain substantially constant natural frequency variations in loading by selecting fiber glass material of the proper density and by subjecting the pad to the proper load or force per unit area.

It is, therefore, an object of the present invention to provide a composite glass fiber pad construction provided with a flexible protective covering that can be made up in relatively large sheets of stock and subsequently cut up into smaller units of any required size without interfering with the flexible protective covering.

It is another object of the present invention to provide a pad construction of the type described that provides a vibration isolator that functions as an auxiliary air spring that modifies the spring action of a pad of glass fiber material.

It is another object of the present invention to provide a pad construction of the type described that provides a vibration isolator that functions as a glass fiber spring provided with shock absorber action.

It is another object of the present invention to provide a pad construction of the type described that functions as a vibration isolator that maintains substantially constant frequencies under variations in the applied force or supported load.

Further objects and advantages of the present invention will be apparent from the following description, reference being had to the accompanying drawings wherein preferred forms of embodiments of the invention are clearly shown.

Figure 1:
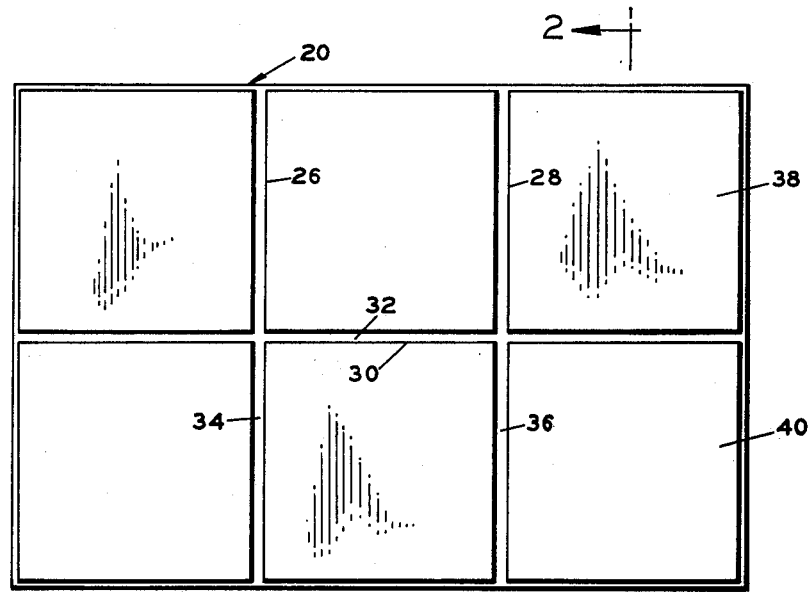
FIG. 1 is a top elevational view of a pad constructed in accordance with the present invention.
Figure 2:
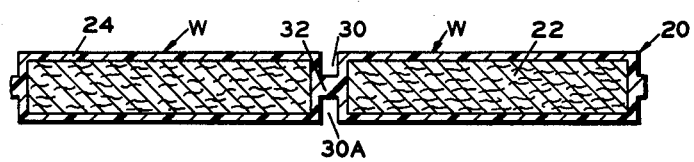
FIG. 2 is a side sectional view of the pad construction of FIG. 1, the section being taken along the line 2—2 of FIG. 1.

Referring in detail to the drawings, FIGS. 1 and 2 illustrate a composite pad indicated generally at 20 that includes a body portion of glass fiber material 22 provided with a fluid impervious flexible covering 24.

The top surface of the pad includes a plurality of intersecting slots 26, 28, and 30 and the bottom surface of the pad is provided with a plurality of intersecting slots one of which is seen at 30–A in FIG. 2. The lower slots are positioned directly opposite the upper slots so as to form relatively thin webs 32, 34, and 36.

Flexible covering 24 is impregnated on the top and bottom surfaces of body portion 22 with a suitable liquid impregnant such as neoprene, rubber, vinyl, or other suitable flexible compositions.

Neoprene has been found to be a particularly suitable material for forming flexible covering 24 since it possesses a high strength modulus, a high modulus of elasticity, and it is highly resistant to contaminants.

All of the webs such as web 32, FIG. 2, are impregnated throughout the entire thickness such that when a web is severed to divide the body units such as body units 38 and 40 the edges of the body units will remain completely sealed against the ingress of contaminants.

In instances where pad 20 is to be used as a vibration isolator when subjected to a load W it is important that the direction of extension of the longitudinal axes of the glass fibers be substantially aligned with the top and bottom surfaces of the pad. With this arrangement the direction of force application by load W is tranverse to the longitudinal axes of the glass fibers of body portion 22.

In accordance with the present invention the glass fiber body portion 22 must meet certain specifications in order to be uniquely excellent for isolating vibrations. The density of the material must be greater than eight pounds per cubic foot, the diameter of the glass fibers must be less than .0005 of an inch, and the length of the glass fibers must be disposed transversely of the direction of load application. For example, fiber diameters between .00020 of an inch and .00024 of an inch gives excellent results in most applications. It has been found that fiber diameters greater than .00060 of an inch result in natural frequencies that are too high for achieving effective vibration isolation and, moreover, pads formed thereof are characterized by inadequate load bearing characteristics. By careful selection of glass fiber diameters, of the air space between the individual fibers, the density, and loading, glass fiber performs like a damped, non-linear spring due to the elasticity of the glass and the pumping action of the entrapped air. Compressing the glass fiber to heavy densities comparable to balsa wood of soft pine, large loads per unit area can be carried by the glass fiber and the damped non-linear spring action is retained.

Figure 3:
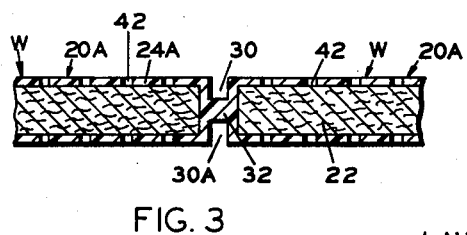
FIG. 3 is a side sectional view of a modified pad construction formed in accordance with the present invention, the section being taken at a location conforming with line 2—2 of FIG. 1.

Reference is next made to FIG. 3 which illustrates a modified composite pad construction 20-A that includes a body portion 22 of glass fiber material of the same construction as that used in the embodiment of FIGS. 1 and 2. The pad of FIG. 3, however, is provided with fluid pervious covering 24-A formed of the same material as impervious covering 24 of FIGS. 1 and 2. Covering 24-A differs from covering 24 in that it includes a plurality of minute passages or orifices that permit air to enter and leave the confines of the flexible covering when the composite pad 20-A is subjected to variations in the force applied by load W.

With continued reference to the embodiment of FIG. 3 it will be understood that the movement of air through orifices 42 serves to damp the spring action of the composite pad 20-A whereby the pad functions as a glass fiber spring provided with shock absorber action.

Since the embodiment of FIGS. 1 and 2 includes an impervious flexible covering this pad construction functions as a glass fiber spring modified by an auxiliary air spring.

In FIG. 3, the intersecting slots such as 30 and 30-A and the webs formed thereby such as web 32 are identical to the corresponding elements previously described in connection with the embodiment of FIGS. 1 and 2.

The figure of merit for a vibration isolator is its transmissibility, the ratio of the transmitted vibratory force to the driving or forcing vibratory force, $$\text{Transmissibility} = \frac{\text{transmitted force}}{\text{driving force}}$$

In order to make this small, it is necessary that the isolator have a natural or resonant frequency considerably lower than the frequency of the driving force. The resonant frequency is the number of cycles or vibrations per second at which an object on a resilient support will vibrate when it is pushed down and released suddenly. The frequency of the driving force is the number of force alternations per second. Thus, a shaft with a simple unbalance rotating at 1200 r.p.m. has a principal driving frequency of 1200/60 or 20 cycles per second (c.p.s.). Usually, the driving force has components having several frequencies, but these can be considered separately with more attention to the lower frequencies where it is more difficult to isolate vibration.

Figure 4:
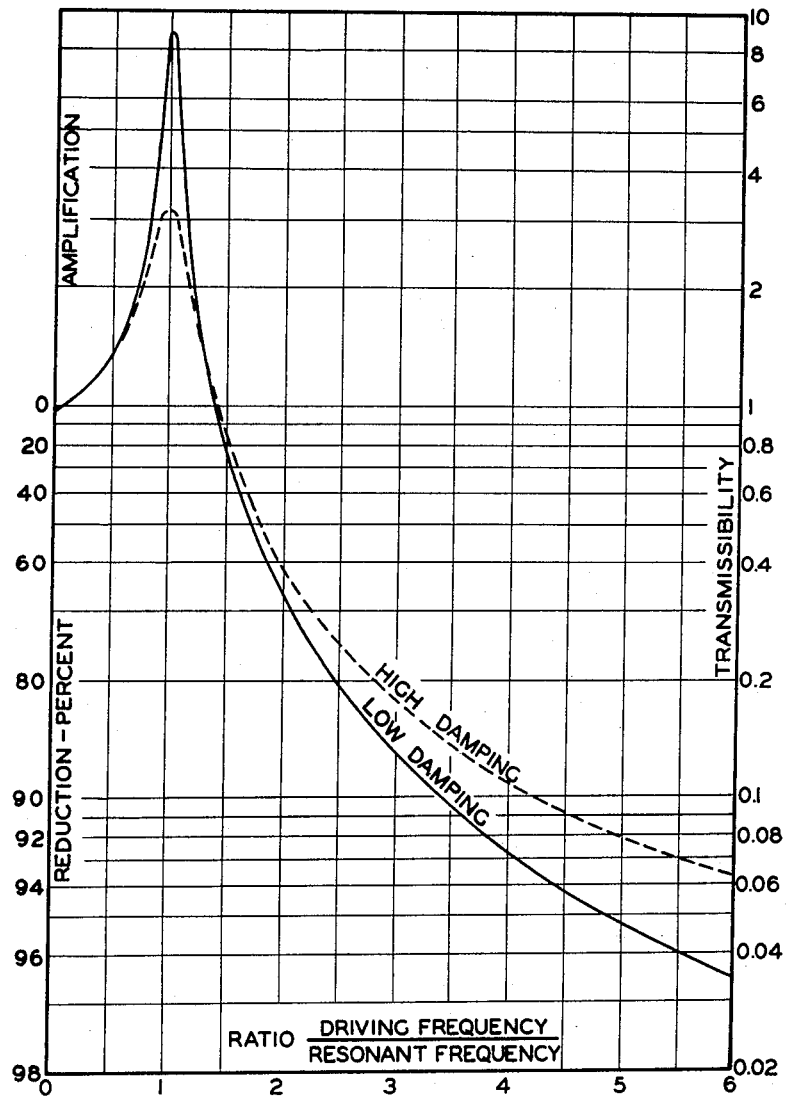
FIG. 4 is a graph illustrating theoretical vibration isolation curves.

The way in which the transmissibility depends on the resonant and driving frequencies is shown in FIG. 4. It is seen that (1) the mounting is effective only for frequency ratios greater than 1.4 (below this, there is amplification of the driving force) and (2) for a given driving frequency, the lower the resonant frequency can be made, the lower the transmissibility will be.

A low resonant frequency is obtained if the stiffness of the isolator is small and the supported weight is large. This combination, however, means a soft support and a large deflection under a static load which may be objectionable because of stability, belt pull, etc. A compromise is often called for and a ratio of frequencies between about 2.5:1 to 4:1 can usually be tolerated. This gives a transmissibility between 0.2 and 0.1, or a reduction of the vibrating force between 80 and 90 percent.

Another factor affecting transmissibility is damping or energy absorption which brings vibrating systems more or less quickly to rest after the driving force has been removed. For example, an automobile has springs to provide a low frequency suspension and has shock absorbers which abstract energy and quickly bring the system to rest after going over a bump. Referring again to FIG. 4, two curves are shown, one for low damping and the other for high damping. Some damping is advantageous near the peak of the curve where the exciting force goes through the resonance region, as in a machine coming up to speed, since this reduces extreme amplitudes, but damping in the operating frequency (speed) region detracts from the vibration isolation effect. This harmful effect is ordinarily not great and, furthermore, the damping is advantageous at higher frequencies involved in noise and shock where the simple theory does not hold.

It is pointed out that no vibration isolation mounting will be as effective as rated if the mounted machinery rests on a resonant or thin support of floor. Thus, machinery on a wooden floor or thin wall will be difficult to isolate.

There are other requirements for a practical vibration isolator aside from its performance in vibration. It must be able to withstand any thrusts necessary for the operation of the machine and must have a long life in spite of mechanical fatigue, corrosion, oxidation, contamination with dirt, oil, moisture, etc. and temperature variations. Glass fiber padding, when not overloaded, is a satisfactory material since it is rather inert chemically and is negligibly affected by the unusual contaminants and temperatures.

In designing a vibration isolator, use has often been made in vibration manuals of curves of deflection under the gravity load of the machine plotted against the resonant frequency. The ratio of this frequency to the driving frequency has then been used to find the transmissibility. Except for special cases, including steel helical springs, this procedure gives lower transmissibility than is actually present. Most non-metallic materials such as rubber, plastics, and fibrous materials deflect slowly under load and also recover slowly. This non-linear action results in a dynamic stiffness for vibration which is two to four times the static stiffness under steady load. Information on transmissibility for the above materials must therefore be obtained from measurements under dynamic or vibratory test conditions.

Unlike rubber, the ratio of thickness to free surface is uniportant and a pad of large area will behave the same when it is cut up into a number of small pads of the same thickness.

Figure 5:
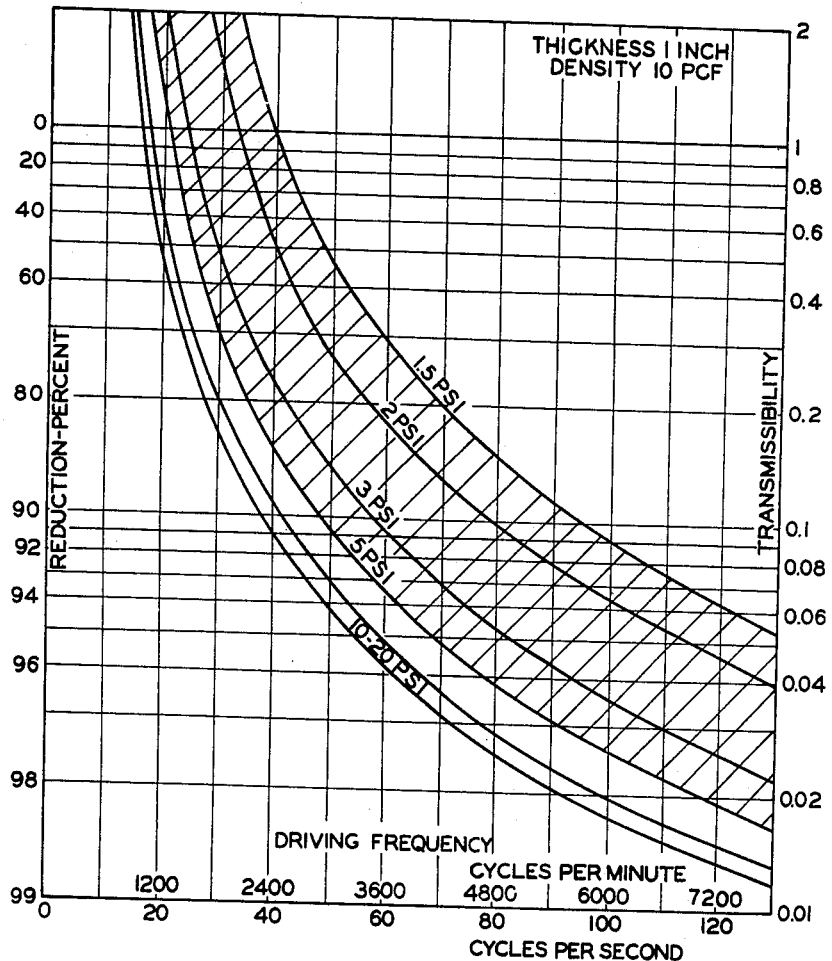
FIG. 5 is a graph showing the vibration isolation characteristics of one-inch thick glass fiber material.

Vibratory tests on glass fiber materials have been made over a considerable range of loads. The results, shown in FIG. 5 are typical for a specific density and can be used as a basis for the design of vibration isolators. Knowing the frequency of the driving force (horizontal scale), the transmissibility or vibration reduction (vertical scale) can be read from the curves for various loads and thicknesses.

For machinery vibration isolations, materials with densities of 10 pounds per cubic foot, or greater, are most practical from a load-bearing standpoint. Design curves are shown for glass fiber to be used as vibration isolation pads. Know the frequency of the driving force (horizontal scale), the desired transmissibility (vertical scale) can be found for various loads and thicknesses. One of the advantages of glass fiber material is that its vibration reduction is not as dependent on exact loading as the reduction for many other materials. This is because glass fiber material becomes stiffer as the load is increased and its effective resonant frequency changes less with load than the resonant frequency of many other materials. The charts show design characteristics for thicknesses of 1 and 2 inches. The reduction for other thicknesses can be found by using FIG. 5 for 1-inch and multiplying the actual driving frequency by the square root of the thickness.

Life tests under combined static and vibration loading have shown that glass fiber materials will stand up in general use at static load deflections of about 50 percent.

Figure 6:
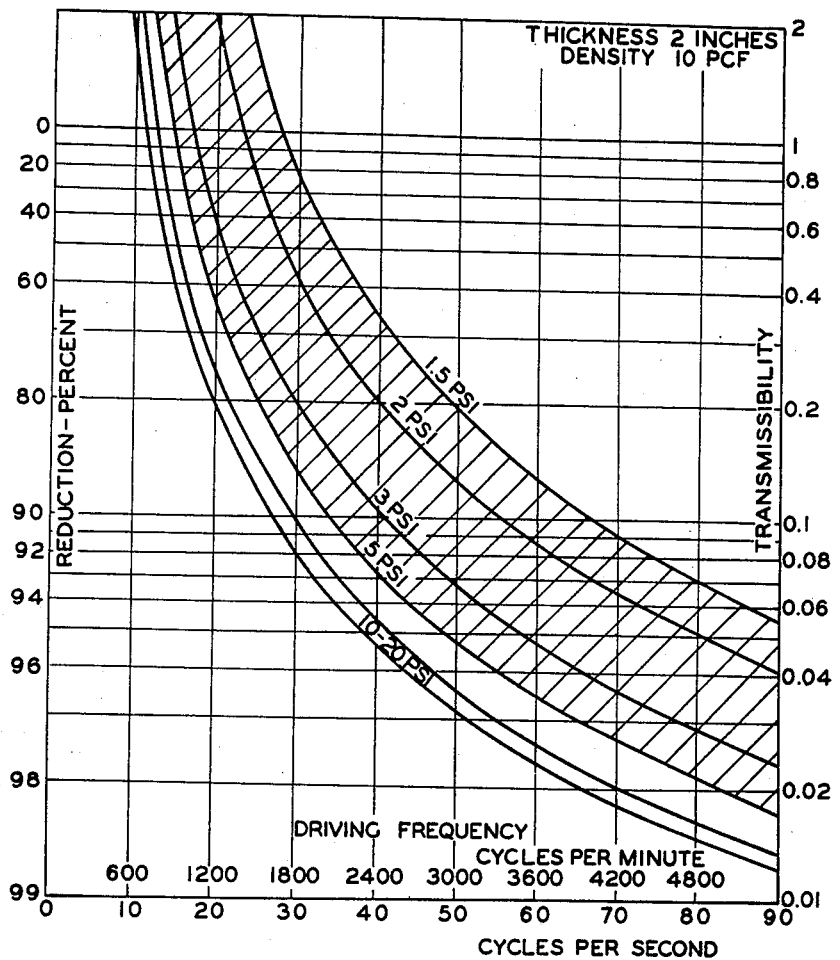
FIG. 6 is a graph showing the vibration isolation characteristics of two-inch thick glass fiber material.

As an example in using the charts, assume that it desired to reduce the vibration of a machine by 90 percent (to ten percent of the vibration force with no isolation). The machine weighs 100 pounds and has a driving frequency of 30 c.p.s. (a rotational speed of 1800 r.p.m.) with a simple unbalance load. On the design charts, the intersection of a horizontal line at 90 percent reduction with a vertical line at 30 c.p.s. driving frequency gives the static load. In FIG. 5, this point falls below the curves, which means that 90 percent reduction cannot be obtained for thicknesses of 1 inch or less. In FIG. 6, however, the point for 90 percent reduction at 30 c.p.s. falls just above the curves for a static pressure load of 10 to 20 p.s.i. The total area of isolating pads will be the total weight divided by the static pressure load, 50 to 100 square inches, and four pads about 4 x 4 inches should be satisfactory.

In operation, the supporting structure is designed in accordance with the graphs 5 and 6, or similar graphs for various other densities, taking into account the particular load to be supported and driving frequency to be encountered.

In accordance with the present invention it has been discovered that pads of glass fiber material of the type described herein have a unique characteristic that makes them particularly suitable for vibration isolation. This characteristic is the maintenance of constant frequency independent of the weight supported by the isolator. The advantage of this useful characteristic is only achieved if the pad of glass fiber material is properly loaded for any given natural frequency and for any given density of the glass fiber isolator.

Figure 7:
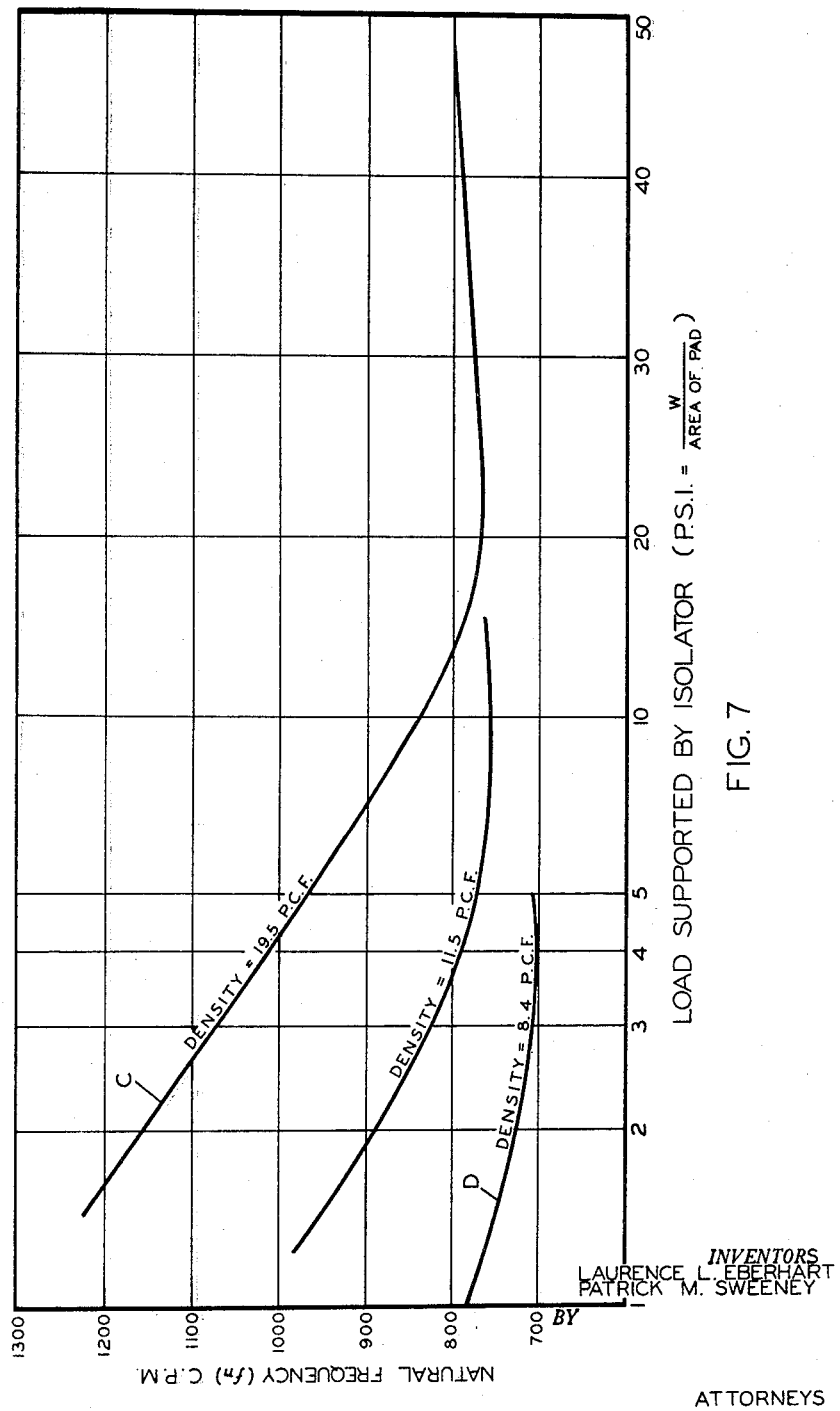
FIG. 7 is a graph showing the relationship between natural frequencies and variations in loads being supported by vibration isolation supports constructed in accordance with the present invention.

FIG. 7 is a graph showing the variations of natural frequency $f_n$ with respect to variations in the load W supported by the isolator for various densities of glass fiber materials ranging between 8.4 and 19.5 pounds per cubic foot.

This unique characteristic of maintaining constant natural frequency can be defined mathematically since the glass fiber pads behave as isolators having a non-linear force deflection curve whose stiffness $k_y$ remains proportional to the weight of the mounted body W at all points on the force-deflection curve. The right side of the below listed equation reduces to a constant, and the natural frequency becomes independent of the weight supported by the isolator.

(1) $$f_n = 3.13\sqrt{\frac{K_y}{W}}$$

Substituting $k_y = dW/d\delta$ in Equation 1 (the force F is equal to the supported weight W) and rearranging terms:

(2) $$\frac{4\pi^2 f_n^2}{g} d\delta = \frac{dW}{W}$$

An expression for the force deflection curve is obtained from the integration of Equation 2. A family of curves results from this process, depending on the constant of integration. A particular curve is specified by selecting a point with the coordinates $W_0$, $\delta_0$ such that all points of the curve whose coordinates are numerically greater than $W_0$, $\delta_0$ will represent conditions of constant natural frequency. Integrating Equation 2:

(3) $$\frac{4\pi^2 f_n^2}{g} \delta \Big/_{\delta_0}^{\delta} = \log W \Big/_{W_0}^{W}$$

Equation 3 may be written exponentially as follows:

(4) $$W = W_0 e A(\delta - \delta_0)$$

An isolator whose force-deflection curve conforms to Equation 4 thus exhibits a constant natural frequency $f_n$ when supporting any load greater than $W_0$.

With reference to FIG. 7, the natural frequency of curve C (19.5 pounds per cubic foot density) remains substantially constant at 780 cycles per minute when the weight of the mounted body W is greater than $W_0$, with $W_0$ being equal to approximately 17 pounds as seen from the abscissa of the graph of FIG. 7 when the weight W of the mounted body is less than $W_0$ (17 pounds), the natural frequency shows the inverse tendency which is characteristic of linear isolators.

With continued reference to FIG. 7 the characteristic of a lower density isolator is illustrated by curve D. Curve D represents a density of the glass fiber material of 8.4 pounds per cubic foot. Here $W_0$ occurs approximately at 3¼ pounds load. Above this loading natural frequency remains substantially constant with variation in load and below this loading the natural frequency shows the inverse tendency which is characteristic of linear isolators.

In the formulas previously discussed herein the following symbols are defined as follows:

$W$ = actual load applied to isolator
$W_0$ = load above which natural frequency is independent of variations in load W
$\delta$ = deflection of isolator under load W
$\delta_0$ = deflection of isolator under load $W_0$
$f_n$ = natural frequency
$k_y$ = stiffness of isolator
$e$ = the basis for the Napierian system of logarithms
$g$ = gravitational constant
$\pi$ = 3.1416

$$A = \frac{4\pi^2 f_n^2}{g}$$

While the forms of embodiments of the present invention as herein disclosed constitute preferred forms, it is to be understood that other forms might be adopted, all coming within the scope of the claims which follow.

We claim:

1. A pad construction comprising, in combination, a body portion of glass fiber material including upper and lower surfaces, the fibers of said material being substantially aligned with said surfaces, said upper surface including a plurality of upper intersecting slots and said lower surface including a plurality of lower intersecting slots respectively positioned opposite said upper intersecting slots to form a plurality of intersecting webs connecting a plurality of body units; a top layer of flexible impregnant on the upper sides of said body units and webs; and a bottom layer of flexible impregnant on the lower sides of said body units and webs, the interior regions of said body portion being free of said impregnant and the entire thickness of said webs being impregnated whereby the edges of said body units remain sealed upon severing of said webs.

2. The pad construction defined in claim 1 wherein said top and bottom layers of flexible impregnant form air impervious flexible coverings for said body units that function as undamped auxiliary air springs.

3. The pad construction defined in claim 1 wherein certain of said layers of flexible impregnant form air pervious flexible coverings for said body units that function as shock absorbers.

4. A vibration isolation system having a substantially constant natural frequency under variations in the weight of a supported load, said system comprising, in combination, a body portion of glass fiber material including upper and lower surfaces, the fibers of said material being substantially aligned with said surfaces, said upper surface including a plurality of upper intersecting slots and said lower surface including a plurality of lower intersecting slots respectively positioned opposite said upper intersecting slots to form a plurality of intersecting webs connecting a plurality of body units; a top layer of flexible impregnant on the upper sides of said body units and webs; a bottom layer of flexible impregnant on the lower sides of said body units and webs, the interior regions of said body portion being free of said impregnant and the entire thickness of said webs being impregnated whereby the edges of said body units remain sealed upon severing of said webs, said body portion having a force-deflection curve conforming to the equation $$W = W_0 e A (\delta - \delta_0)$$

and a load supported by said pad and having a weight substantially equal to or greater than $W_0$, and in which $W$ = actual load applied
$W_0$ = load above which natural frequency is independent of variations in load $W$
$\delta$ = deflection under load $W$
$\delta_0$ = deflection under load $W_0$
$f_n$ = natural frequency
$e$ = the base for Napierian logarithms
$g$ = gravitational constant $$A = \frac{4\pi^2 f_n^2}{g}$$

5. The vibration isolation system defined in claim 4 wherein said top and bottom layers of flexible impregnant form air impervious flexible coverings for said body units that function as undamped auxiliary air springs.

6. The vibration isolation system defined in claim 4 wherein certain of said layers of flexible impregnant form air pervious flexible covering for said body units whereby said body units function as shock absorbers.

References Cited in the file of this patent

UNITED STATES PATENTS

| | | |
|---|---|---|
| 2,395,949 | Wilkins | Mar. 5, 1946 |
| 2,769,741 | Schwartz | Nov. 6, 1956 |
| 2,854,230 | Jones et al. | Sept. 30, 1958 |
| 3,018,991 | Slayter | Jan. 30, 1962 |

FOREIGN PATENTS

| | | |
|---|---|---|
| 530,679 | Belgium | Aug. 14, 1954 |